Dec. 20, 1932.  V. E. FLODIN  1,891,759
COCK
Filed March 22, 1930   2 Sheets-Sheet 1
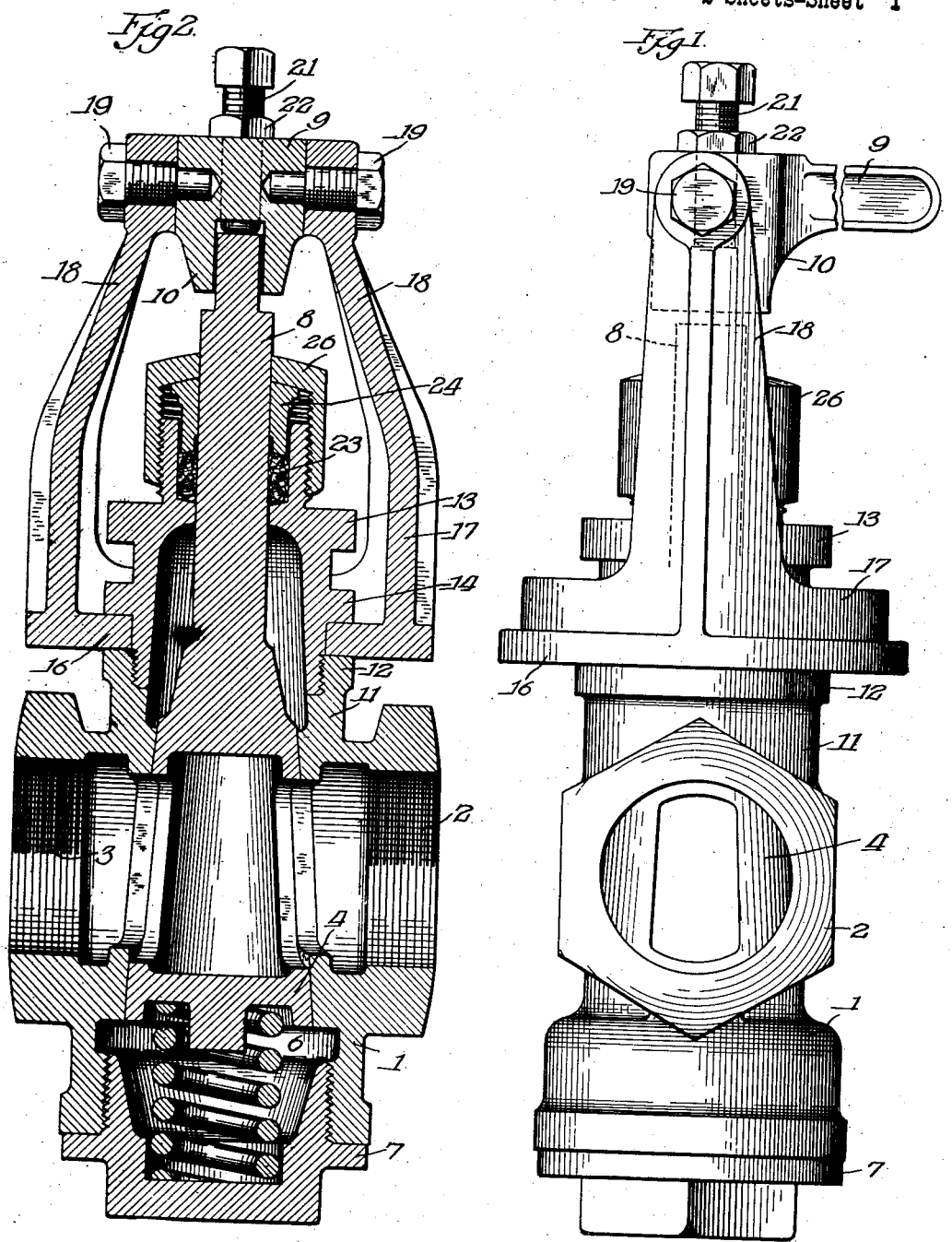

Dec. 20, 1932.　　　V. E. FLODIN　　　1,891,759
COCK
Filed March 22, 1930　　2 Sheets-Sheet 2
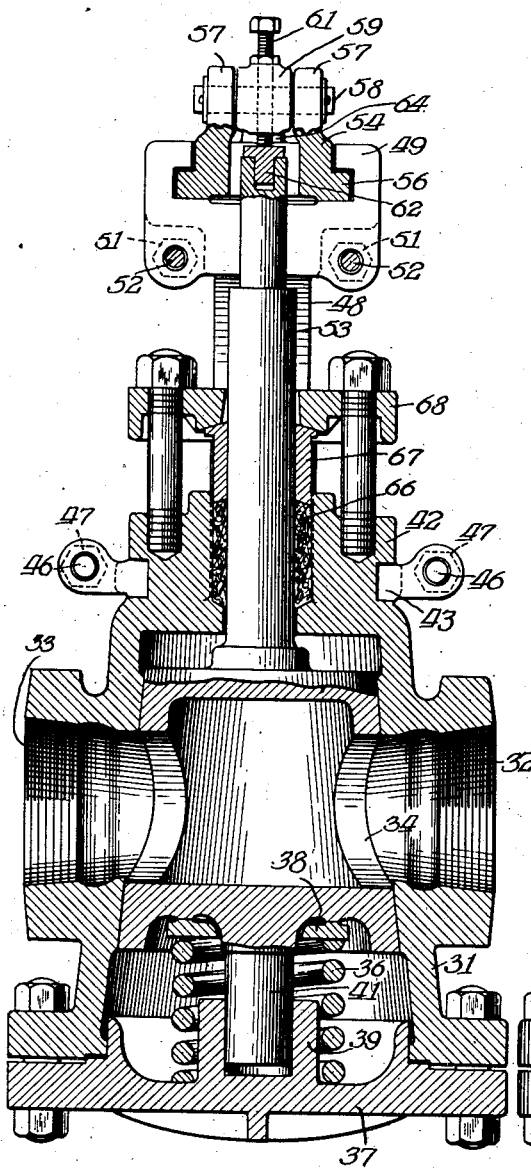

Patented Dec. 20, 1932

1,891,759

UNITED STATES PATENT OFFICE

VICTOR E. FLODIN, OF OAK PARK, ILLINOIS, ASSIGNOR TO CRANE CO., OF CHICAGO, ILLINOIS, A CORPORATION OF ILLINOIS

COCK

Application filed March 22, 1930. Serial No. 438,021.

This invention relates to cocks and has for its purpose to provide a cock which may be termed an easy operating cock, that is, a cock which may be readily operated under all conditions.

In many piping installations it is often desirable if not necessary, to use a cock type of valve instead of a globe or gate valve. It is a common failing, however, of cock type valves generally known as cocks to become stuck and resist almost every effort to operate them. This is due to the fact that they have relatively large metal to metal seating surfaces which in operation do not become separated from each other, but merely slide upon each other. This tendency to stick is even more prevalent where the cocks are not operated frequently or where fluids of high temperatures or pressures are being transported.

It is the general practice to overcome this difficulty by hammering the cock. It is obvious, however, that such treatment soon damages the cock which becomes leaky therefrom and is therefore useless.

According to this invention means are provided for breaking the rotating member of the cock from the body before rotation thereof. In other words, means are provided for moving the closure member axially as well as rotatably.

In the preferred embodiment a handle is provided which is operatively connected to the closure member of the cock in such a manner that the same handle may be utilized to first break the cock and then rotate the closure member of the cock.

A better understanding may be had of this invention from the following detailed description given in connection with the drawings, in which:

Fig. 1 is a side elevation of a cock constructed in accordance with this invention, Fig. 2 is a vertical section through substantially the center of the cock shown in Fig. 1, Fig. 3 is a side elevation similar to Fig. 1, illustrating a modified form of this invention, and Fig. 4 is a vertical section through substantially the center of the valve shown in Fig. 3.

Referring particularly to Figs. 1 and 2, there is shown a cock having a body 1 formed with an inlet and outlet 2 and 3. The body is also provided with the usual tapered bore within which is seated the closure member or plug 4, the latter being ported to control flow through the cock. The plug is maintained in tight seating relation by a coiled compression spring 6 placed under compression between the head of the plug and a cap 7 screwthreaded to the body 1. The cap 7 is of sufficient size to permit withdrawal of the plug through that end of the body upon removal of the cap. The plug may also be ground in by removing the cap 7, spring 6 and applying a proper tool to the end of the plug. The smaller end of the plug 4 is provided with an elongated stem 8 which may be cast integrally therewith as shown and which is flat sided at its extremity to be engaged by an operating handle or lever 9. The handle is provided with a bifurcated portion 10 arranged to engage the flat sided end of stem 8.

Adjacent and surrounding the smaller end of plug 4 the body is provided with a circular boss 11 terminating in a rim 12 threaded internally to receive a guide block 13, the latter being formed with a flange 14. The flange 14 is of substantially the same diameter as rim 12 and when the block 14 is in place is opposed thereto, leaving an annular channel or groove between the two.

Block 14 serves to secure an annular flange 16 of the yoke member 17 to the body by clamping the flange 16 between rim 12 and flange 14. In this manner the yoke is rotatably secured to the body. The yoke is also provided with an upwardly extending pair of yoke arms 18 converging toward each other at their upper extremities and between which the lever 9 is pivoted by means of trunnion studs 19.

The handle 9 is tapped to receive a set screw 21 at a point laterally spaced or offset from the pivotal point of the handle and over the end of stem 8. The screw 21 is adjusted to contact with the upper end of the stem 8 to move the stem and plug axially and downwardly upon pivotal movement of the handle 9 about studs 19. The amount of movement of the stem and plug may be determined by the adjustment of set screw 21 which may be locked in its adjusted position by a lock nut 22.

In order to prevent leakage when the plug is displaced axially, the block 13 may be counter-bored to provide a packing chamber to receive packing 23 held in place by the usual gland 24 and packing nut 26. From the above it is seen that the block 13 serves not only as a locking means for the yoke but as a guiding means for the stem and a packing means for the stem.

From the above it is apparent that through the medium of stem 8, handle 9 and yoke 17 means are provided whereby the plug may be moved against the action of spring 6 and freed, that is, the cock may be broken as the term is used, after which it may be rotated freely.

The operation of the cock is believed to be apparent from the above and may be summarized as follows: The lever or handle 9 may be swung downwardly about its pivot which will force set screw 21 into engagement with the upper end of stem 8 moving the stem and plug downwardly in a direction parallel to the axis thereof against the action of spring 6 and release the plug thus eliminating the friction between the sides of the plug and the body. After moving the plug axially the handle may be swung laterally, thereby rotating the plug 14 about its axis. During this movement the plug, stem, handle and yoke will rotate, the latter member rotating in the channel formed between flange 14 and rim 12.

Referring to Figs. 3 and 4 there is shown a modified form of cock in which the plug must be moved axially before it can be moved rotatably. In this modification the plug cannot be twisted during its rotational movement due to the fact that it first must be freed. The construction of this embodiment of the invention is basicly the same as that described in connection with Figs. 1 and 2, although deviating therefrom in some details. In this form of the invention the body 31 is provided as usual with an inlet and outlet 32 and 33 and a central tapered bore to receive a tapered plug 34. The plug is maintained in seating position by a spring 36 placed under compression between the larger end of the plug and a flanged cap 37, the latter being secured to a companion flange formed upon the lower end of the body by suitable bolts. In order to reduce the friction of the spring upon the lower end of the plug, a friction plate 38 is inserted between the uppermost convolution of the spring and the lower face of the plug. In this modification the cap 37 also serves as a bearing or guide for the plug for which purpose the cap is provided with a central boss 39 drilled to receive a depending post 41 projecting downwardly from the plug.

Instead of a removable block and a unitary yoke, the body is provided with a boss 42 having an annular groove formed therearound which serves as a bearing channel for the flange 43 of a split yoke 44. The flanged split yoke is bolted together and held in place by bolts 46 extending through ears 47. The yoke 44 has a pair of upwardly extending arms 48 which terminate in a split channeled collar 49. The collar 49 is provided with a pair of ears 51 through which bolts 52 pass, thus maintaining the two halves of the collar together.

As in the prior modification, the smaller end of plug 34 is provided with a stem 53 which may be cast integrally with the plug and which terminates in a flat-sided end portion. This flat-sided end portion is engaged by the lower portion 50 of collar 49 whereby the stem and plug may be rotated by rotating collar 49, the latter being the upper end of yoke 44.

Mounted for rotation about the upper end of stem 53 and within the channeled collar 49 is a block 54 having a laterally projecting flange 56 arranged to engage in the channel within collar 49. This engagement will permit rotation therein but prevent vertical movement thereof. The block 54 is provided with a pair of opposed upstanding ears 57 through which a fulcrum pin 58 passes. An operating lever or handle 59 is pivoted upon the pin 58 between ears 57 and is bored and tapped to receive a set screw 61 offset from the fulcrum point of the handle and positioned to engage the upper end of stem 53. In order to prevent undue wear, a wear plate or plug guard 62 is inserted between the end of set screw 61 and the top end of stem 53, the latter being recessed to receive a portion of the plate. The handle may thus be pivoted about pin 58 to move the plug axially.

To connect the handle to the stem so that the stem may be rotated by the handle the latter is provided with a recess 63 arranged to receive a lug 64 preferably cast integrally upon the collar 49.

The set screw 61 is adjusted to bear against plug guard 62 and maintain handle 59 out of engagement with lug 64 until handle 59 has been moved downwardly, thereby moving stem 53 and plug 34 axially to disengage the plug. After the plug has been disengaged the plug and stem are free to rotate without any undue torsional strain and may be rotated by rotation of handle 63, the latter being locked to the yoke through lug 64, thus rotating yoke 44 and stem 53.

As in the prior modification means are provided to prevent leakage around stem 53. For this purpose the boss 42 is counter-bored to receive packing 66 held in place by gland 67 and a packing flange 68.

It follows from the above that there is provided a cock having means for moving the closure member vertically i. e. parallel to the axis of the plug to break or free the same, which movement must be accomplished before the closure member or plug may be rotated to control the flow through the cock. Without first depressing the lever handle 59, the lever will merely rotate block 54 within the channel of collar 49. Upon depressing the lever, however, the plug is moved axially against the action of spring 36 and the handle will thereafter engage lug 64 rotating yoke 44 which engages the flat-sided end of stem 53 to rotate the latter.

It is obvious that many changes may be made in the details of construction without departing from the spirit or scope of the invention as defined in the claim appended hereto.

I claim:

In a cock, a body, a closure rotatable within said body to selectively obstruct or permit flow through said body, a yoke secured to said body for rotation with respect thereto, means connecting said yoke to said closure for rotation therewith, a block rotatably supported by said yoke, an operating handle pivoted to said block, and means for selectively connecting said handle to said yoke for rotation therewith, said handle also being connected to said closure for moving said closure in a direction parallel to the axis thereof, said connections being arranged whereby said handle is inoperative to rotate said closure until said closure has first been moved in a direction parallel to its axis.

In witness of the foregoing I affix my signature.

VICTOR E. FLODIN.